United States Patent
Hämäläinen et al.

(10) Patent No.: US 6,570,860 B2
(45) Date of Patent: *May 27, 2003

(54) DATA TRANSMISSION METHOD IN A TDMA MOBILE COMMUNICATION SYSTEM

(75) Inventors: Jari Hämäläinen, Tampere (FI); Jari Vainikka, Vantaa (FI); Zhi-Chun Honkasalo, Vantaa (FI); Harri Jokinen, Hiisi (FI); Harri Posti, Oulu (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/817,963
(22) PCT Filed: Sep. 26, 1995
(86) PCT No.: PCT/FI95/00526
  § 371 (c)(1),
  (2), (4) Date: Mar. 27, 1997
(87) PCT Pub. No.: WO96/10320
  PCT Pub. Date: Apr. 4, 1996

(65) Prior Publication Data
  US 2002/0057667 A1 May 16, 2002

(30) Foreign Application Priority Data
  Sep. 27, 1994 (FI) .................................................. 944487

(51) Int. Cl.$^7$ .......................... H04Q 7/00; H04B 7/212; H04J 3/16
(52) U.S. Cl. ........................ 370/329; 370/468; 370/337
(58) Field of Search ................................. 370/329, 331, 370/337, 341, 347, 468, 332, 336, 442, 330, 335, 436, 348

(56) References Cited

U.S. PATENT DOCUMENTS

| | | | |
|---|---|---|---|
| 4,949,395 A | * | 8/1990 | Rydbeck .................... 370/336 |
| 5,200,956 A | | 4/1993 | Pudney et al. ............. 370/280 |
| 5,239,545 A | * | 8/1993 | Buchholz .................... 370/348 |

(List continued on next page.)

FOREIGN PATENT DOCUMENTS

| | | |
|---|---|---|
| CA | 2112762 | 7/1994 |
| EP | 332 818 | 9/1989 |
| EP | 615 393 | 9/1994 |

OTHER PUBLICATIONS

"Technical Comparison between CDMA and GSM," "RF Design Technique of CDMA Mobile Telecommunication System," "Design of CDMA Control station," "The Present State of CDMA Mobile Communication System Operating Technology," Institute of Electronics Engineers of Korea, vol. 21, No. 1, Jan. 1994 (Articles 1, 2, 3 and 4).

Primary Examiner—Kwang B. Yao
Assistant Examiner—Hanh Nguyen
(74) Attorney, Agent, or Firm—Pillsbury Winthrop LLP (57) ABSTRACT

A method and apparatus for data transmission in a time division multiple access (TDMA) mobile communication system, in which one or more time-slots may be allocated to a mobile stations for data transmission. The mobile station indicates, upon setting up a data call, to the mobile communication network a desired level of service for the user data transfer and the mobile communication network assigns the mobile station for a data call a channel configuration consisting of one or more time-slots in connection with call set-up or handover. The assigned channel configuration depends on the resources currently available in the mobile communication network and enables a data channel performance which is within the limits of the desired level of service.

22 Claims, 4 Drawing Sheets

U.S. PATENT DOCUMENTS

| | | | | |
|---|---|---|---|---|
| 5,278,833 A | * | 1/1994 | Crisler et al. | 370/913 |
| 5,309,503 A | * | 5/1994 | Bruckert et al. | 370/436 |
| 5,448,621 A | * | 9/1995 | Knudsen | 370/329 |
| 5,506,848 A | * | 4/1996 | Drakopoulos et al. | 370/336 |
| 5,579,306 A | * | 11/1996 | Dent | 370/330 |
| 5,590,133 A | * | 12/1996 | Billstrom et al. | 370/337 |
| 5,592,469 A | * | 1/1997 | Szabo | 370/342 |
| 5,839,071 A | * | 11/1998 | Johnson | 370/331 |
| 5,889,770 A | * | 3/1999 | Jokiaho et al. | 370/337 |
| 5,898,925 A | * | 4/1999 | Honkasalo et al. | 370/337 |
| 6,005,857 A | * | 12/1999 | Honkasalo et al. | 370/337 |
| 6,072,787 A | * | 6/2000 | Hamalainen et al. | 370/335 |
| 6,122,088 A | * | 8/2000 | Haartsen | 370/331 |

* cited by examiner

```
   MS              BSS (old/new)            MSC

MEAS REPORT
   ─────────────▶
   MEAS REPORT
   ═════════════▶

HANDOVER CMD/
   ASSIGNMENT CMD
   ◀─────────────
   HANDOVER COM/
   ASSIGNMENT COM
   ═════════════▶
                   HANDOVER PERFORMED
                   ──────────────────▶    FIG. 7
```

DATA TRANSMISSION METHOD IN A TDMA MOBILE COMMUNICATION SYSTEM

This application is the national phase of international application PCT/FI95/00526 filed Sep. 26, 1995 which designated the U.S.

FIELD OF THE INVENTION

The invention relates to a method for data transmission in a time division multiple access (TDMA) mobile communication system, comprising the step of assigning one or more time-slots to a mobile station for data transmission depending on the data transfer rate required by an application using the mobile station.

BACKGROUND OF THE INVENTION

In mobile telecommunication systems of the time division multiple access (TDMA) type, communication takes place on the radio path in successive TDMA frames, each of which consists of several time-slots. In each time-slot, a short information packet is sent in form of a radio frequency burst which has a finite duration and which consists of a set of modulated bits. The timeslots are mainly used for conveying control channels and traffic channels. On the traffic channels, speech and data are transmitted. On the control channels, signalling between a base station and mobile subscriber stations is carried out. An example of a TDMA radio system is the Pan-European mobile communication system GSM (Global System for Mobile Communications).

For communication in conventional TDMA systems, each mobile station is assigned one channel time-slot for data or speech transmission. Thus, the GSM system, for instance, may have up to eight parallel connections to different mobile stations on a same carrier frequency. The maximum data transfer rate on one traffic channel is restricted to a relatively low level depending on the available channel bandwidth as well as the channel coding and error correction used in the transmission. In the GSM system, for instance, the user rate is 9.6 kbit/s or 12 kbit/s. In addition, in the GSM system a so-called half-rate (max. 4.8 kbit/s) traffic channel may be chosen for low speech coding rates. A half-rate channel is established when a mobile station communicates in a time-slot only in every second timeslot, i.e. at half-rate. A second mobile station communicates in every second time-slot of the same frame. The capacity of the system in terms of the number of subscribers may thus be doubled, in other words, up to 16 mobile stations may communicate simultaneously on the same carrier frequency.

In the last few years, the need for high-speed data services in mobile communication networks has remarkably increased. Data transfer rates of at least 64 kbit/s would be required for utilizing ISDN (Integrated Services Digital Network) circuit switched digital data services, for example. Data services of the public network PSTN, such as modems and telefax terminals of class G3, require higher transfer rates, such as 14.4 kbit/s. One of the growing areas of mobile data transfer that requires higher transfer rates than 9.6 kbit/s is the mobile video service. Services of this kind include e.g. security control by cameras, and video databases. The minimum data transfer rate in video transfer may be, for instance, 16 or 32 kbit/s.

The data transfer rates of the present mobile communication networks are not, however, adequate to satisfy these new needs.

One way to solve the problem is to use multiple TDMA time-slots for communication with a mobile station. In this way, one mobile station may transmit and receive data at higher data transfer rates by multiplexing the data to multiple time-slots (traffic channels). This is termed as multi-slot access technique.

When multiple time-slots are used for communication with one mobile station, problems arise if a sufficient number of traffic channels in not available. This may occur in the call set-up phase or in a handover. Handover refers to switching the mobile station from one channel onto another channel of the same cell or an adjacent cell during an ongoing call. A problem arises if the mobile station is operating at a high data transfer rate, and the new cell can not provide after the handover a data transfer rate as high as that of the previous cell. One solution would be to interrupt the connection if the quality i.e. the data transfer rate of the data transfer service is not adequate in the call set-up or handover, or after the handover. However, this solution is not acceptable.

SUMMARY OF THE INVENTION

An object of the present invention is to relieve the problems caused by capacity restrictions in a mobile communication network which employs the multi-slot access technique in data transmission.

This is achieved with the method for data transmission in a time division multiple access (TDMA) mobile communication system, comprising the step of assigning one or more time-slots to a mobile station for data transmission depending on the data transfer rate required by an application using the mobile station. The method is characterized in that the mobile station indicates to the mobile communication network the minimum and maximum requirements for the user data transfer rate, and that the mobile communication network assigns the mobile station for a data call a channel configuration consisting of one or more time-slots in connection with call set-up or handover. Said channel configuration depends on the network resources currently available in the mobile communication network and enables the data channel performance which is not lower than said minimum requirement and not higher than said maximum requirement. The serving mobile communication network will interrupt a data call set-up or a handover attempt of a data call if the mobile communication network has not sufficient network resources for providing the minimum requirement of the mobile station for the user data transfer rate. Said resources of the mobile communication network, depending of which the channel configuration determining the user data transfer rate is assigned to a data call, include at least the time-slot resources of the serving cell and the timeslot resources of the target cell for handover.

In the invention, the data transfer rate of a data call is reduced in a mobile communication system employing a so-called multi-slot access technique when a channel configuration that meets the maximum requirements for the user data transfer rate is not available. This may take place during call set-up or handover. The mobile station may start a high-speed data connection by transmitting the serving mobile communication network the minimum and the maximum requirements for the user data transfer rate, in addition to the presently specified parameters used for establishing a data call. These requirements may include the following parameters: the required level of service (data transfer rate) and the desired level of service (data transfer rate). The desired level of service determines the data transfer rate the mobile station wishes to be able to use. Simultaneously, the desired data transfer rate is the maximum data transfer rate to be allowed for the mobile station. With this parameter, the user of the mobile station may, e.g. call-specifically, in each case choose the most appropriate data transfer service in terms of speed and costs. The required level of service determines the minimum data transfer rate that must be provided for ensuring the continuity of data transfer. If the required data transfer rate cannot be provided, the call set-up is interrupted or the data call is interrupted. With this parameter, the user of the mobile station may, e.g. call-specifically, choose the lowest data transfer rate that in each case is sufficient for data transfer purposes. The parameters of the invention thus provide flexibility to the subscriber of the mobile station in the selection of the data transfer service. Alternatively, the parameters may be permanently set at the mobile station, or the mobile station may select the appropriate parameters. These parameters, i.e. the required and the desired level of service, allow the mobile communication network to vary the data transfer rates of individual mobile stations in accordance with the needs and the traffic load of the network, within the limits set by the parameters, without causing any disturbance to the users. In particular, these parameters allow the mobile communication network to reduce the data transfer rate if the new cell is not capable of providing the desired data transfer rate in connection with call set-up or handover. Thus, the number of calls interrupted or prevented due to the lack of resources decreases.

Instead of transferring the parameters, the mobile station may indicate said minimum and maximum requirements to the mobile communication network in a number of alternative ways, such as indicating the level of service. The minimum and the maximum requirements used are then selected in accordance with the indicated level of service in the mobile communication network.

It is also possible that the mobile station does not set any requirements for the minimum data transfer rate, or it leaves the minimum performance to be freely chosen by the mobile communication network.

As a result, the service of the data call may be continued in the new cell after the handover, totally regardless of how the data call was served in the previous cell, or independently of the service provided by the new cell.

The invention also relates to a mobile communication system for implementing the method.

BRIEF DESCRIPTION OF THE DRAWINGS

In the following, the invention will be described in closer detail by way of example with the aid of the preferred embodiments of the invention and with reference to the attached drawings, in which.

THE PREFERRED EMBODIMENTS OF THE INVENTION

The present invention may be applied to high-speed data transfer in most digital TDMA based mobile communication systems, such as the Pan-European digital mobile communication system GSM, DCS1800 (Digital Communication System), UMTS (Universal Mobile Telecommunication System), FPLMTS (Future Public Land Mobile Telecommunication System), etc.

Figure 1:
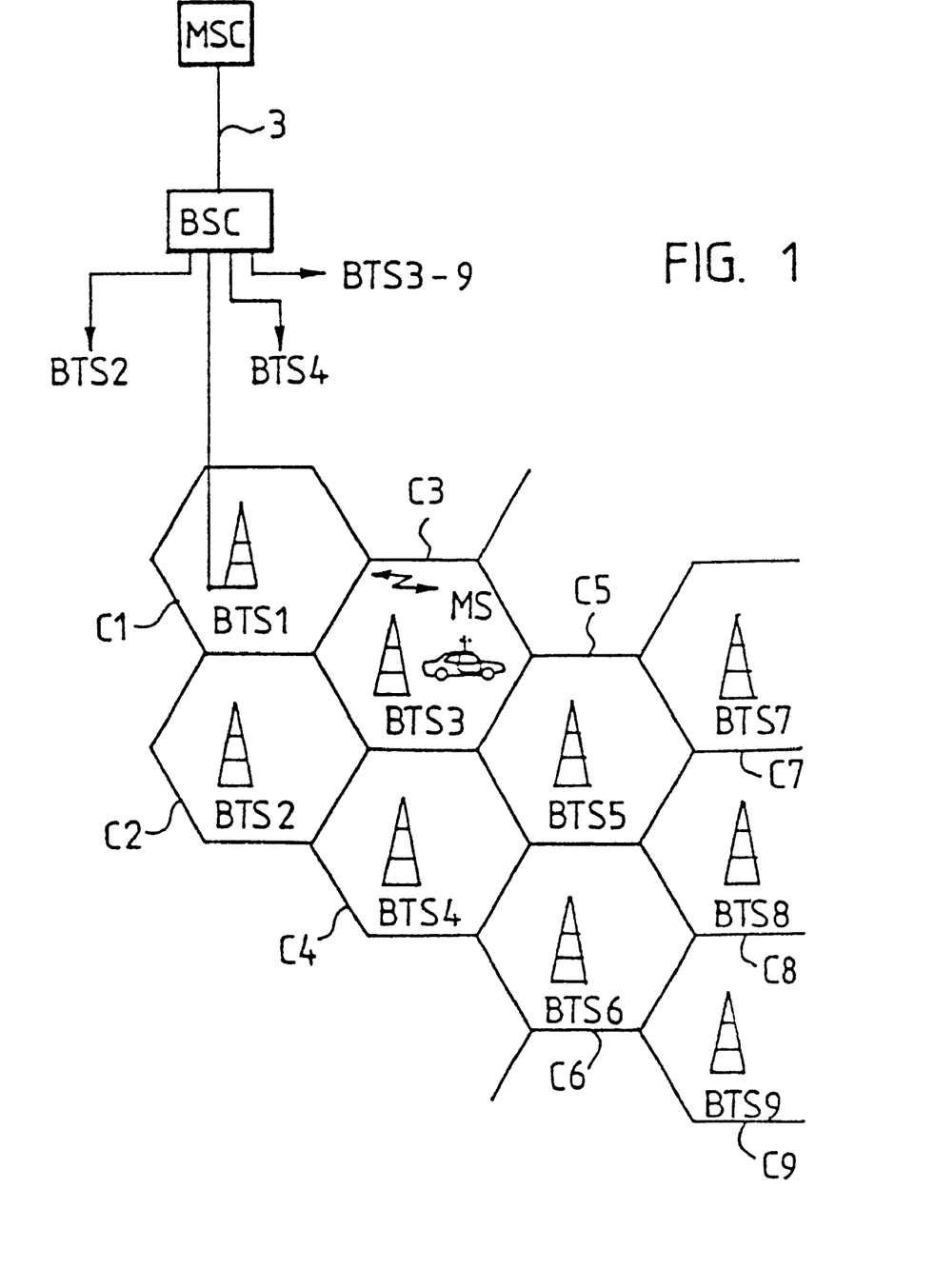
FIG. 1 illustrates a part of the mobile communication system in which the method of the invention may be applied.

FIG. 1 describes a mobile communication system of the same type as GSM by way of example. GSM (Global System for Mobile Communications) is a pan-European mobile communication system. FIG. 1 shows very briefly the basic structure of the GSM system, not paying closer attention to its characteristics or other aspects of the system. The GSM system is described in greater detail in GSM recommendations and in "The GSM System for Mobile Communications", M. Mouly & M. Pautet, Palaiseau, France, 1992, ISBN:2-9507190-0-7, which are incorporated herein by reference.

A mobile services switching centre (MSC) is in charge of switching incoming and outgoing calls. It performs similar operations as the exchange of a public switched telephone network (PSTN). In addition, it also performs operations typical of mobile telecommunication only, such as subscriber location management, jointly with the subscriber registers of the network. The GSM system contains at least such subscriber registers as home location register (HLR) and visitor location register (VLR), which are not shown in FIG. 1. Specific information on the location of the subscriber, such as the location area, are stored in a visitor location register VLR, the number of which is typically one per each mobile services switching centre (MSC). The location data in the HLR, in turn, indicates the VLR within the area of which a mobile station MS is located. Mobile stations MS are switched to the MSC by means of base station systems. A base station system BSS comprises a base station controller BSC and base stations BTS. One BSC is used for controlling several BTSs. The tasks of the BSC include e.g. handovers in such cases in which handover is performed within a base station or between two base stations both controlled by the same BSC. FIG. 1 shows for clarity one base station system only, in which a base station controller BSC is connected with nine base stations BTS1-BTS9, having coverages which, in turn, provide corresponding radio cells C1–C9.

The GSM system is a time division multiple access (TDMA) method in which time-division traffic takes place on the radio path in successive TDMA frames each of which consists of several time-slots. In each time-slot, a short information packet is sent in form of a radio frequency RF burst which has a finite duration and which consists of a set of modulated bits. The time-slots are mainly used for conveying control channels and traffic channels. On the traffic channels, speech and data are transmitted. On the control channels, signalling between a base station and mobile subscriber stations is carried out.

Figure 2:
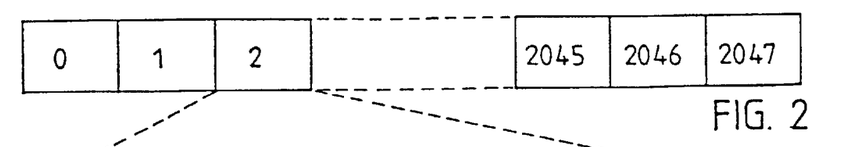
FIGS. 2, 3, 4 and 5 illustrate the TDMA frame structure.
Figure 3:
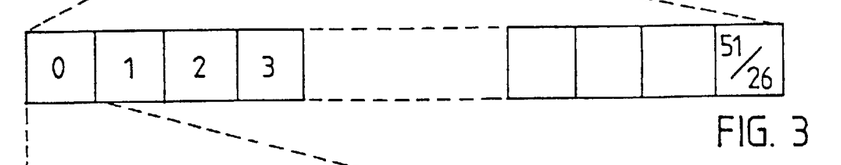
Figure 4:
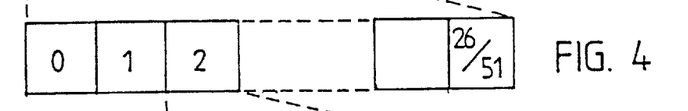
Figure 5:
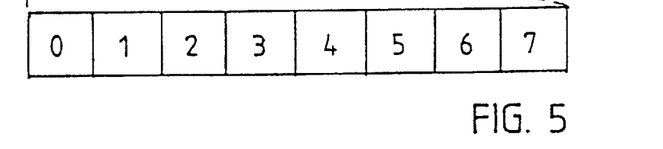

Channel structures used in the radio interface of the GSM system are defined in closer detail in the ETSI/GSM recommendation 05.02. The TDMA frame structure of the GSM system is illustrated by way of example in FIGS. 2–5. FIG. 5 shows one TDMA basic frame which includes eight time-slots 0–7 used as traffic channels or control channels. Only one RF burst shorter than the duration of the time-slot is thus transmitted in each time-slot. Once one TDMA basic frame ends in time-slot 7, the time-slot 0 of the following basic frame immediately begins. Thus, 26 or 51 successive TDMA frames form one multiframe depending on whether a traffic channel or a control channel structure is in question, as illustrated in FIG. 4. A superframe, in turn, consists of 51 or 26 successive multiframes depending on whether the multiframes have 26 or 51 frames, as illustrated in FIG. 3. A hyperframe consists of 2048 superframes, as illustrated in FIG. 2.

In normal operation, a mobile station MS is assigned at the beginning of a call one time-slot as a traffic channel from one of the carrier frequencies (single-slot access). The mobile station is synchronized with the assigned time-slot for transmitting and receiving RF bursts.

In data transfer in accordance with the invention, when a mobile station MS requires a data transfer rate higher than can be provided by one traffic channel for transmission of user data, said MS is assigned a channel or a time-slot configuration that comprises two or more time-slots from one or more timeslots in one or several frames by means of a so-called multi-slot access technique. It is not essential to the present invention which multi-slot access technique is used. An example of a multi-slot access technique for which the present invention is well suited is disclosed in PCT/FI95/00248 and PCT/FI95/00249. In these applications, a high-speed signal is multiplexed to several low-speed channels (time-slots) transferred over the radio path and demultiplexed in a receiver back to one signal. These documents are incorporated herein by reference.

As it has been stated previously, however, problems arise in connection with the multi-slot access technique if there is not a sufficient number of channels available. This may occur in the call set-up phase and also in connection with handover.

In accordance with the present invention, the minimum and the maximum requirements for the data transfer rate of user data are indicated by the mobile station to the serving mobile communication network at the beginning of call set-up. Said requirements are two. new parameters, in addition to the presently specified parameters used for establishing a data call. Indicating the requirements to the mobile communication network refers herein to all the manners in which the mobile station can indicate the minimum and the maximum requirements, without limiting e.g. to direct transmission of the requirements as such. For example, the mobile station may indicate a desired level of service, in which case the MS is provided at least the performance of the data channel defined by the minimum requirement for this level of service, but not more than the performance of the data channel defined by the maximum requirement for this level of service.

In the following examples, these minimum and maximum requirements are defined with -parameters "required level of service" and "desired level of service", but the requirements may be defined in other ways, as well. The desired level of service determines the data transfer rate, i.e. the channel configuration provided by one or more traffic channels or time-slots that the mobile station wishes to be able to use. Simultaneously, this desired data transfer rate is also the maximum data transfer rate to be allowed to the mobile station. The required level of service determines the minimum data transfer rate that must be provided for ensuring the continuity of data transfer. With the aid of these parameters, the mobile communication network may, depending on the resources of the network, assign a data call a data transfer rate which is within the limits of the desired data transfer rate and the required data transfer rate. Provided that not even the minimum data transfer rate can be provided, the data call or the call set-up is interrupted. It is also possible in some situations that the specific requirements set by the mobile station for the minimum level of service and the minimum data transfer rate are optional, i.e. the MS does not give any specific rate, but leaves the minimum performance to be freely chosen by the mobile communication network.

Figure 8:
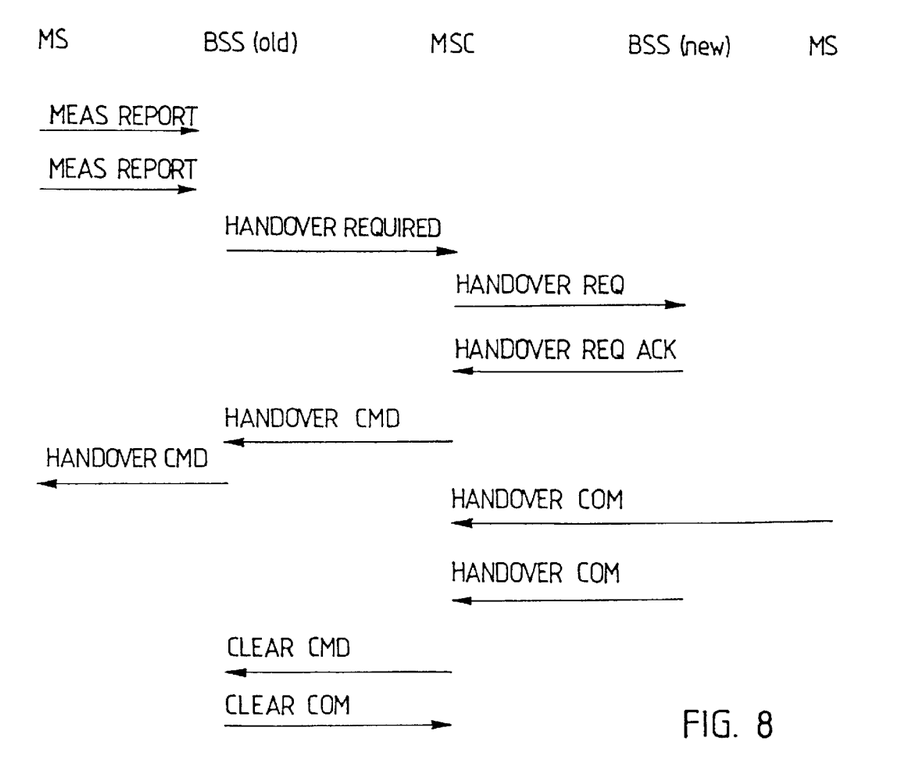
Figure 9:
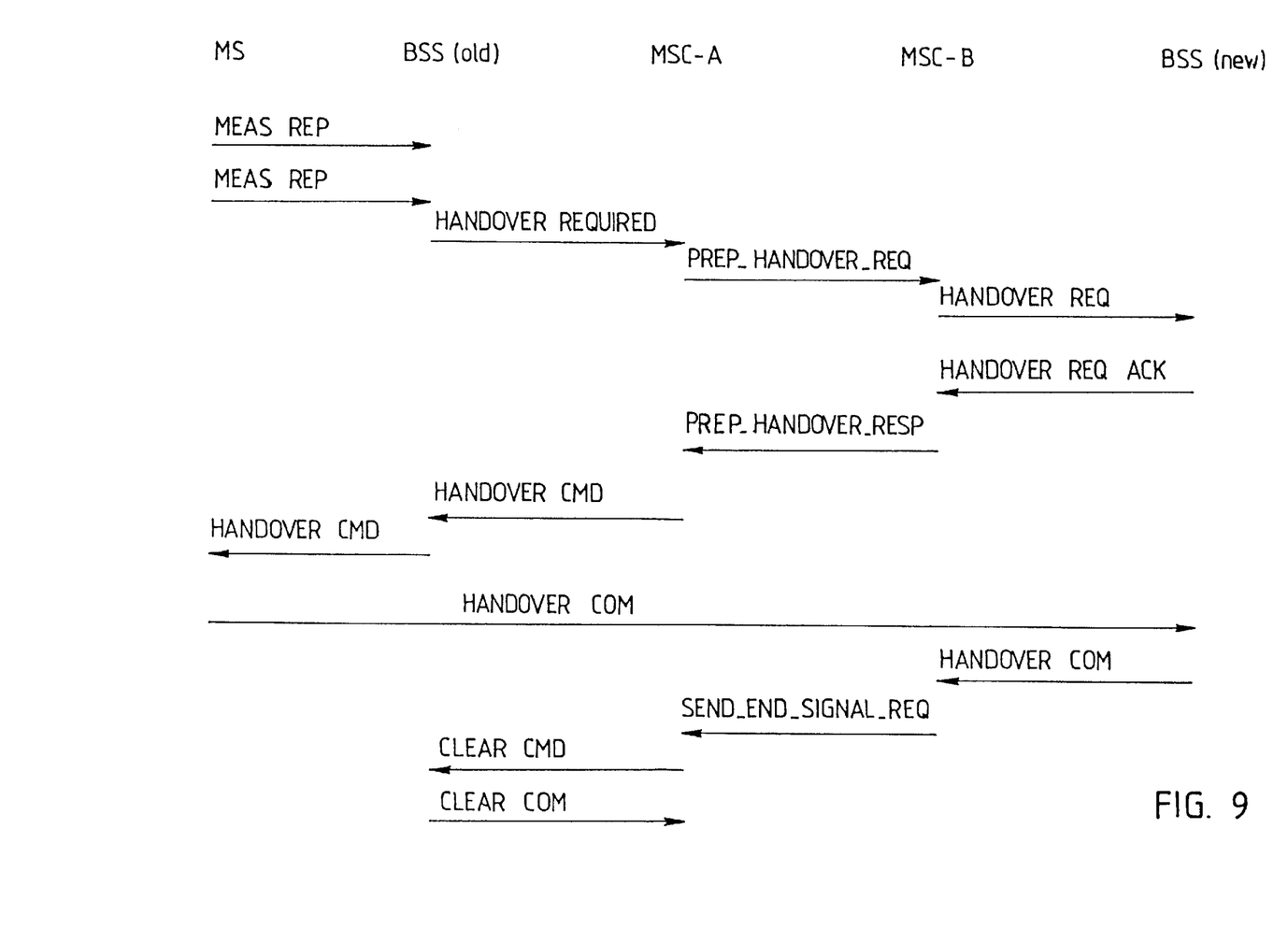

In the following, the invention will be described in closer detail by way of example, in connection with call set-up (FIG. 6), handover within one base station system BSS (FIG. 7), handover between base station systems BSS (FIG. 8), and handover between mobile services switching centres (FIG. 9).

Figure 6:
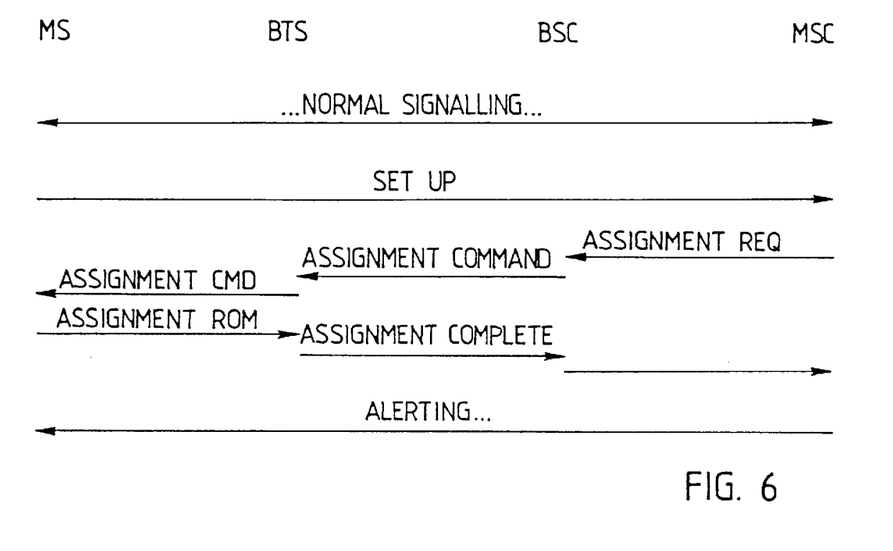
FIGS. 6, 7, 8 and 9 are signalling diagrams, relating to call set-up, handover within one base station system BSS, handover between base station systems BSS, and handover between mobile services switching centres respectively, according to the invention.

FIG. 6 shows, in connection with call set-up, only the signalling that is essential to disclosing the invention. It must be noted, however, that in addition to the described signalling messages, other messages are also transmitted in connection with the call set-up, which are not shown herein for clarity, however. As to the GSM system, for instance, this signalling is precisely defined in the GSM specifications concerning call set-up.

In FIG. 6, normal call set-up signalling takes place first, whereafter the MS sends a call set-up message SETUP, which is forwarded to the MSC. In accordance with the invention, the SETUP message contains, in addition to the parameters normally required for setting up a data connection, two new parameters, the maximum desired data transfer rate DRMAX and the minimum required data transfer rate DRMIN. In the SETUP message of the GSM system, these parameters may be included in a Bearer Capability Information Element BCIE. The BCIE is disclosed in the GSM recommendation 04.08, version 4.7.0, pages 435–443. The MSC sends a serving BSC an assignment request message (Assignment REQ), which is modified to contain parameters DRMAX and DRMIN. The BSC checks whether it has a sufficient capacity for serving the data call, and assigns the data call, depending on the current capacity, some time-slot configuration corresponding to the data transfer rate, which is within the limits of parameters DRMAX and DRMIN. Thereafter, the BSC sends the BTS serving the MS an assignment command message (Assignment Command), which contains the information on the time-slots assigned to the data call and on the assigned data transfer rate. The BTS sends the MS an assignment command message (Assignment Command), which contains the information on the time-slots assigned to the data call and on the assigned data transfer rate. The MS starts to prepare for data transfer in the assigned time-slots at the assigned data transfer rate, and sends the BTS an assignment acknowledgement (Assignment Complete). The BTS sends the BSC an acknowledgement (Assignment Complete). The BSC, in turn, sends the MSC an assignment acknowledgement (Assignment Complete), which contains the information on the data transfer rate assigned to the data call by the BSC. After this, normal call set-up signalling takes place for starting the transfer.

If the BSC is not capable of assigning the data call the time-slot configuration corresponding to the minimum required data transfer rate DRMIN due to lack of network resources, it will send a report to the MSC, in form of an Assignment Failure message. Then the MSC interrupts the call set-up. The network resources that determine the data transfer rate to be assigned to the data call include at least the traffic channels, i.e. the time-slots that are available at the BTS serving the MS at that particular moment.

Figure 7:
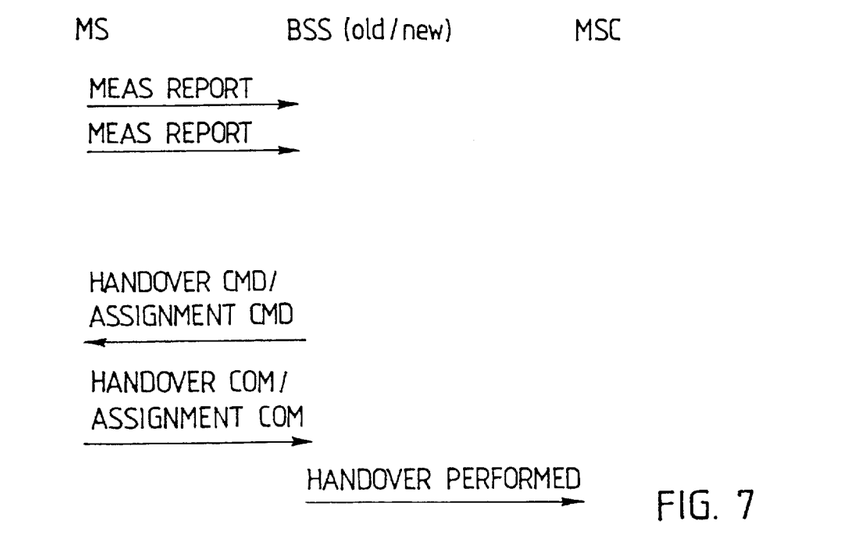

FIGS. 7–9 show only the signalling that is essential to disclosing the invention. However, it must be noticed that in addition to the signalling messages described above, other messages are also sent in a handover situation, although these messages are not described herein for clarity. As to the GSM system, for instance, this signalling is precisely defined in the GSM specifications concerning call set-up.

In intra-BSS handover illustrated in FIG. 7, the MS regularly reports the measurement results of the downlink signals of the adjacent cells to the BSC of the serving BSS (Meas Report). The BSC makes the handover decisions on the basis of the criteria of the radio path by utilizing these measurements, or for other reasons, such as for distributing the capacity. After making the handover decision, the BSC assigns the data call, depending on at least the time-slot resources of the target cell of the handover, a channel configuration that provides a data transfer rate which is at-least the minimum required data transfer rate DRMIN and not higher than the maximum desired data transfer rate DRMAX. The data transfer rate (time-slot configuration) provided by the new cell is not necessarily the same as that provided by the previous cell. In other words, the data transfer rate may increase or reduce in the new cell in accordance with the available resources and within the limits of parameters DRMAX and DRMIN. The BSC or the BTS store parameters DRMAX and DRMIN for every MS that is located within their area and has an ongoing high-speed data call. Provided that the minimum required data transfer rate cannot be provided, the handover attempt will be interrupted, and an adjacent cell, second best in terms of other criteria and able to provide an adequate data transfer rate, will be selected as the new target cell for handover. The BSC sends the MS a handover command message (Handover Command), which contains the information on the assigned data transfer rate, and the description of the assigned time-slots. Now the MS is able to start communication with the channel configuration assigned in the new cell, and it sends an acknowledgement (Handover Completed) to the BSS. The BSS, in turn, sends the message Handover Performed to the MSC.

If the intra-BSS handover takes place within one cell without a change of the data transfer rate, the BSC may send the MS, instead of the Handover Command message, an Assignment Command, which contains the information on the assigned data transfer rate and the description of the assigned time-slots. Accordingly, the acknowledgement of the MS is Assignment Complete.

FIG. 8 illustrates handover between two base station systems. An MS sends the serving BSS(old) the results of the adjacent cell measurements (Meas Report), which is the case in normal GSM signalling. BSS (old), or particularly its BSC, detects the need for handover to a cell of a new BSS(new), e.g. on the basis of the criteria of the radio path. BSS(old) sends the serving MSC a handover request Handover Required. This message contains, in addition to the standard GSM message, the maximum desired data transfer rate DRMAX and the minimum required data transfer rate DRMIN, given by the MS at the beginning of the data call. Either the BSC or the BTS stores parameters DRMIN and DRMAX for every MS that is located within their area and has an ongoing high-speed data call. The MSC sends the new BSS(new), or in particular its BSC, a Handover Request, in which the BSS(new) is requested to provide the requested service. This message also contains, in addition to the standard GSM message, parameters DRMAX and DRMIN. BSS(new) selects, depending on at least the time-slot resources of the handover target cell, a time-slot configuration that provides a data transfer rate which is not lower than the minimum required data transfer rate DRMIN and not higher than the maximum desired data transfer rate DRMAX. The data transfer rate (time-slot configuration) provided by the new cell is not necessarily the same as that in the previous cell. In other words, the data transfer rate may increase or reduce in the new cell in accordance with the available network resources and within the limits of parameters DRMAX and DRMIN. Provided that the minimum required data transfer rate DRMIN can not be provided, the handover attempt will be interrupted. If there are network resources available, BSS(new) sends the MSC an acknowledgement message Request Acknowledge, which contains the information on the assigned data transfer rate, and the description of the assigned time-slots. BSS(old) sends the MS a Handover Command message, which contains the information on the assigned data transfer rate, and the description of the assigned time-slots. Now the MS is able to start communication in a new cell in base station system BSS(new) by using the assigned data transfer rate and the assigned time-slots. The MS sends BSS(new) an acknowledgement Handover Completed, and BSS(new) sends a similar acknowledgement Handover Completed to the MSC. Thereafter, the MSC releases the resources assigned for the data call in the old base station system BSS(old).

FIG. 9 shows a handover between two MSCs. An MS sends the serving BSS(old) the results of the adjacent cell measurements (Meas Report), as in normal GSM signalling. BSS(old), or in particular its BSC, detects the need for handover to a cell of a new BSS(new) e.g. on the basis of the criteria of the radio path. BSS(old) sends the serving MSC-A a handover request Handover Required. This message contains, in addition to the standard GSM message, the maximum desired data transfer rate DRMAX and the minimum required data transfer rate DRMIN, given by the MS at the beginning of the data call. Either the BSC or the BTS stores parameters DRMAX and DRMIN for every MS that is located in their area and has an ongoing high-speed data call. MSC-A sends the new MSC-B a handover request Prep Handover Req, which contains, in addition to the standard GSM message, the desired parameters DRMAX and DRMIN. MSC-B sends BSS(new), or in particular its BSC, a Handover Request, in which the BSS(new) is requested to provide the requested service. This message also contains, in addition to the standard GSM message, parameters DRMAX and DRMIN. BSS (new) selects, depending on at least the time-slot resources of the handover target cell, a channel configuration that provides a data transfer rate which is not lower the minimum required data transfer rate DRMIN and not higher than the maximum desired data transfer rate DRMAX. The data transfer rate (time-slot configuration) provided by the new cell is not necessarily the same as that in the previous cell. In other words, the data transfer rate may increase or reduce in the new cell in accordance with the available resources and within the limits of parameters DRMAX and DRMIN. If the minimum required data transfer rate DRMIN can not be provided, the handover attempt will be interrupted. If there are resources available, BSS (new) sends MSC-B an acknowledgement message Handover Request Acknowledge, which contains the information on the assigned data transfer rate, and the description of the allocated time-slots. Thereafter, MSC-B sends the serving MSC-A an acknowledgement message Prep Handover Resp, which contains the information on the assigned data transfer rate, and the description of the assigned time-slots, in addition to the normal content specified in accordance with GSM. MSC-A sends the serving BSS (old) a handover command message Handover Command, which contains the information on the assigned data transfer rate, and the description of the assigned time-slots. BSS(old) sends the MS a handover command message Handover Command, which contains the information on the assigned data transfer rate, and the description of the assigned time-slots. Now the MS is able to start communication in a new cell in BSS (new) by using the assigned channel configuration, and the assigned data transfer rate and the assigned time-slots. The MS sends BSS(new) an acknowledgement Handover Completed, and BSS(new) sends a similar acknowledgement Handover Completed to MSC-B. Thereafter, MSC-B sends the serving MSC-A an acknowledgement message Send End Signal Req, from which MSC-A knows that the MS has been handed over to a new base station system in MSC-B. Thereafter, resources assigned for the data call are released in the old base station system BSS(old).

The figures and the explanation associated therewith are only intended to illustrate the present invention. The method of the invention may vary in its details within the scope of the attached claims.

What is claimed is:

1. A method for data transmission in a time division multiple access (TDMA) mobile communication system, in which two or more time-slots per frame are allocatable to a mobile station for data transmission at a higher data rate than that supported by use of one time slot per frame, said mobile station participating in setting up a data call for data transmission primarily requiring two or more time slots per frame, the mobile station indicating to the mobile communication system a desired level of service for the user data transfer in terms of a maximum requirement for a user data transfer rate or a time slot configuration on said data call for data transmission primarily requiring two or more time slots per frame, the mobile communication system assigning upon call setup or handover said mobile station for said data call a channel configuration consisting of one or more time slots per frame, said channel configuration depending on the resources currently available in the mobile communication system and enabling a data channel performance which is within the limits of said desired level of service.

2. A method as claimed in claim 1, wherein said resources of the mobile communication system include at least the time slot resources of the serving cell and/or the time-slot resources of the target cell for handover.

3. A method as claimed in claim 2, wherein said setting up of said data call comprises sending, by the mobile station, to a mobile services switching centre a call set-up message indicating said desired level of service for the requested data service, sending from the serving mobile services switching centre to a base station controller of a serving base station system an assignment request message, which indicates said desired level of service, selecting at the base station controller, depending on at least the time-slot resources of a serving base station, a channel configuration that meets said desired level of service, sending from the base station controller to the serving base station an assignment command message, which contains the information on the allocated channel configuration, sending from the serving base station to the mobile station an assignment command message, which contains the information on the channel configuration allocated to the data call, sending from the mobile station to the serving base station an assignment acknowledgement, sending from the base station to the base station controller an assignment acknowledgement, sending from the base station controller to the mobile services switching centre an assignment acknowledgement.

4. A method as claimed in claim 1, further comprising recording in the base station system said desired level of service indicated by the mobile station, for controlling the channel configuration.

5. A method as claimed in claim 1, wherein said assigning is practiced in connection with a handover with a serving base station system, which handover comprises measuring at the mobile station downlink signals of adjacent cells, sending from the mobile station to a serving base station system results of said measurement, determining at the serving base station system the need for handover within the base station system, selecting at the serving base station system, depending on at least the time slot resources of a target cell for handover, a channel configuration that meets said desired level of service, sending from the serving base station system to the mobile station a handover command, which contains the information on the allocated channel configuration, changing the mobile station over to use the channel resources in accordance with the handover command in the target cell.

6. A method as claimed in claim 1, wherein said assigning is practiced in connection with a handover between a serving base station system and a new base station system, which handover comprises measuring at the mobile station downlink signals of adjacent cells, sending from the mobile station to a serving base station system results of said measurement, determining at the serving base station system the need for handover to a new base station system, sending from the serving base station system to the serving mobile services switching centre a handover request, which indicates said desired level of service, sending from the serving mobile services switching centre to the new base station system a handover request, which indicates said desired level of service, selecting at the new base station system, depending on at least the time-slot resources of a target cell for handover, a channel configuration within limits of said desired level of service, sending from the new base station system to the serving mobile services switching centre an acknowledgement message, which contains the information on the allocated channel configuration, sending from the serving mobile services switching centre to the serving base station system a handover command, which contains the information on the allocated channel configuration, sending from the serving base station system to the mobile station a handover command, which contains the information on the allocated channel configuration, changing the mobile station over to use the channel resources in accordance with the handover command in the target cell.

7. A method as claimed in claim 1, wherein said assigning is practiced with handover between a serving mobile services switching center and a new mobile services switching system which handover comprises:

measuring at the mobile station downlink signals of adjacent cells, sending from the mobile station to a serving base station system results of said measurement, determining at the serving base station system determining the need for handover to a new base station system located within the area of a new mobile services switching center sending from a serving base station system to the serving mobile services switching centre a handover request indicating said desired level of service, sending from the serving mobile services switching centre to the new mobile services switching centre a handover request indicating said desired level of service, sending from the new mobile services switching centre to the new base station system a handover request indicating said desired level of service, selecting at the new base station system, depending on at least the time-slot resources of a target cell for handover, a channel configuration within limits of said desired level of service, sending from the new base station system to the new mobile services switching centre an acknowledgement message, which contains the information on the allocated channel configuration, sending from the new mobile services switching centre to the serving mobile services switching centre command, which contains the information on a handover the allocated channel configuration, sending from the serving mobile services switching centre to the serving base station system a handover command, which contains the information on the allocated channel configuration, sending from the serving base station system to the mobile station a handover command message, which contains the information on the allocated channel configuration, changing the mobile station over to use the channel resources in accordance with the handover command in the target cell.

8. A method as claimed in claim 1, wherein the mobile station does not set any specific standards for the minimum performance of the data transfer rate, or it leaves the minimum performance to be freely chosen by the mobile communication network.

9. A method as claimed in claim 1, further comprising indicating a maximum desired level of service by the mobile station, selecting a minimum level of service by the mobile communications system.

10. A method for data transmission in a time division multiple access (TDMA) mobile communication system, in which two or more time-slots per frame are allocatable to a mobile station for data transmission at a higher data rare than that supported by use of one time slot per frame, said mobile station participating in setting up a data call for data transmission primarily requiring two or more time slots per frame, the mobile station indicating, to the mobile communication system a desired level of service for the user data transfer on said data call for data transmission primarily requiring two or more time slots per frame, the mobile communication system assigning upon call setup or handover said mobile station for said data call a channel configuration consisting of one or more time slots per frame, said channel configuration depending on the resources currently available in the mobile communication system and enabling a data channel performance which is within the limits of said desired level of service, and indicating said desired level of service in terms of: a maximum requirement and a minimum requirement for a user data transfer rate or a time slot configuration of the data call.

11. A method as claimed in claim 10, further comprising interrupting a call set-up or a handover attempt of a data call by the mobile communication system if there are not sufficient resources available in the mobile communication system for providing the minimum requirement set by said desired level of service.

12. A time division multiple access (TDMA) mobile communication system, in which two or more time slots per frame are allocatable to a mobile station for data transmission at a higher data rate than that supported by use of one time slot per frame, said mobile station participating in setting up a data call for data transmission primarily requiring two or more time slots per frame, said mobile station indicating to the mobile communication system a desired level of service for the user data transfer in terms of a maximum requirement for a user data transfer rate or a time slot configuration for said data call for said data transmission primarily requiring two or more time slots per frame, the mobile communication system assigning upon call setup or handover the mobile station for said data call a channel configuration consisting of one or more time-slots per frame, said channel configuration depending on the resources currently available in the mobile communication network and enabling a data channel performance which is within the limits of said desired level of service.

13. A system as claimed in claim 12, wherein said indication of said desired level of service is in terms of a maximum requirement for a user data transfer rate or a time slot configuration of the data call.

14. A system as claimed in claim 12, wherein a minimum level of service is undefined by the mobile station.

15. A system as claimed in claim 12, wherein a minimum level of service is selectable by the mobile communications network.

16. A system as claimed in claim 12, wherein at least the time-slot resources of the serving cell and/or the time-slot resources of the target cell for handover.

17. A time division multiple access (TPMA) mobile communication system, in which two or more time slots per frame are allocatable to a mobile station for data transmission at a higher data rate than that supported by use of one time slot per frame.

said mobile station participating in setting up a data call for data transmission primarily requiring two or more time slots per frame, said mobile station indicating to the mobile communication system a desired level of service for the user data transfer for said data call for said data transmission primarily requiring two or more time slots per frame, the mobile communication system assigning upon call setup or handover the mobile station for said data call a channel configuration consisting of one or more time-slots per frame, said channel configuration depending on the resources currently availble in the mobile communication network and enabling a data channel performance which is within the limits of said desired level of service wherein said desired level of service is presented in terms of a maximum requirement and a minimum requirement for a user data transfer rate or a time slot configuration of the data call.

18. A system as claimed in claim 15, wherein
the mobile communication network is arranged to interrupt a call set-up or a handover attempt of a data call if there are not sufficient resources available in the mobile communication network for providing the minimum requirement or the minimum service of level.

19. A method for data transmission in a time division multiple access (TDMA) mobile communication system, in which two or more time-slots per frame are allocatable to a mobile station for data transmission at a higher data rate than that supported by use of one time slot per frame,
said mobile station participating in setting up a data call for data transmission primarily requiring two or more time slots per frame,
the mobile station indicating to the mobile communication system a desired level of service for the user data transfer in terms of a maximum requirement for a user data transfer rate or a time slot configuration on said data call for data transmission primarily requiring two or more time slots per frame, said desired level of service being covered by two or more different channel configurations, each providing a different data channel performance,
the mobile communication system assigning upon call setup or handover said mobile station for said data call one of said two or more different channel configurations consisting of one or more time slots per frame, depending on the resources currently available in the mobile communication system so that one of said different data channel performances which are within the limits of said desired level of service is provided.

20. A method for data transmission in a time division multiple access (TDMA) mobile communication system, in which two or more time-slots per frame are allocatable to a mobile station for data transmission at a higher data rate than that supported by use of one time slot per frame,
said mobile station participating in setting up a data call for data transmission primarily requiring two or more time slots per frame,
the mobile station indicating, to the mobile communication system a desired level of service for the user data transfer on said data call for data transmission primarily requiring two or more time slots per frame, said desired level of service being covered by two or more different channel configurations, each providing a different data channel performance,
the mobile communication system assigning upon call setup or handover said mobile station for said data call one of said two or more different channel configurations consisting of one or more time slots per frame, depending on the resources currently available in the mobile communication system so that one of said different data channel performances which are within the limits of said desired level of service is provided,
the mobile station indicating, to the mobile communication system, said desired level of service for the user data transfer in terms of: a maximum requirement and a minimum requirement for a user data transfer rate or a time slot configuration of the data call.

21. A time division multiple access (TDMA) mobile communication system, in which two or more time slots per frame are allocatable to a mobile station for data transmission at a higher data rate than that supported by use of one time slot per frame,
said mobile station participating in setting up a data call for data transmission primarily requiring two or more time slots per frame,
said mobile station indicating to the mobile communication system a desired level of service for the user data transfer in terms of a maximum requirement for a user data transfer rate or a time slot configuration for said data call for said data transmission primarily requiring two or more time slots per frame, said desired level of service being covered by two or more different channel configurations, each providing a different channel performance,
the mobile communication system assigning upon call setup or handover the mobile station for said data call one of said two or more different channel configurations consisting of one or more time-slots per frame, depending on the resources currently available in the mobile communication network so that one of said different a data channel performances which are within the limits of said desired level of service is provided.

22. A time division multiple access (TDMA) mobile communication system, in which two or more time slots per frame are allocatable to a mobile station for data transmission at a higher data rate than that supported by use of one time slot per frame,
said mobile station participating in setting up a data call for data transmission primarily requiring two or more time slots per frame,
said mobile station indicating to the mobile communication system a desired level of service for the user data transfer for said data call for said data transmission primarily requiring two or more time slots per frame, said desired level of service being covered by two or more different channel configurations, each providing a different channel performance,
the mobile communication system assigning upon call setup or handover the mobile station for said data call one of said two or more different channel configurations consisting of one or more time-slots per frame, depending on the resources currently available in the mobile communication network so that one of said different data channel performances which is within the limits of said desired level of service is provided wherein said desired level of service is presented in terms of a maximum requirement and a minimum requirement for a user data transfer rate or a time slot configuration of the data call.

* * * * *